Feb. 15, 1949.  E. B. HEDMAN  2,462,022
CUTTER SHAFT WITH INCLINABLE CUTTERBLADE
Filed March 16, 1945
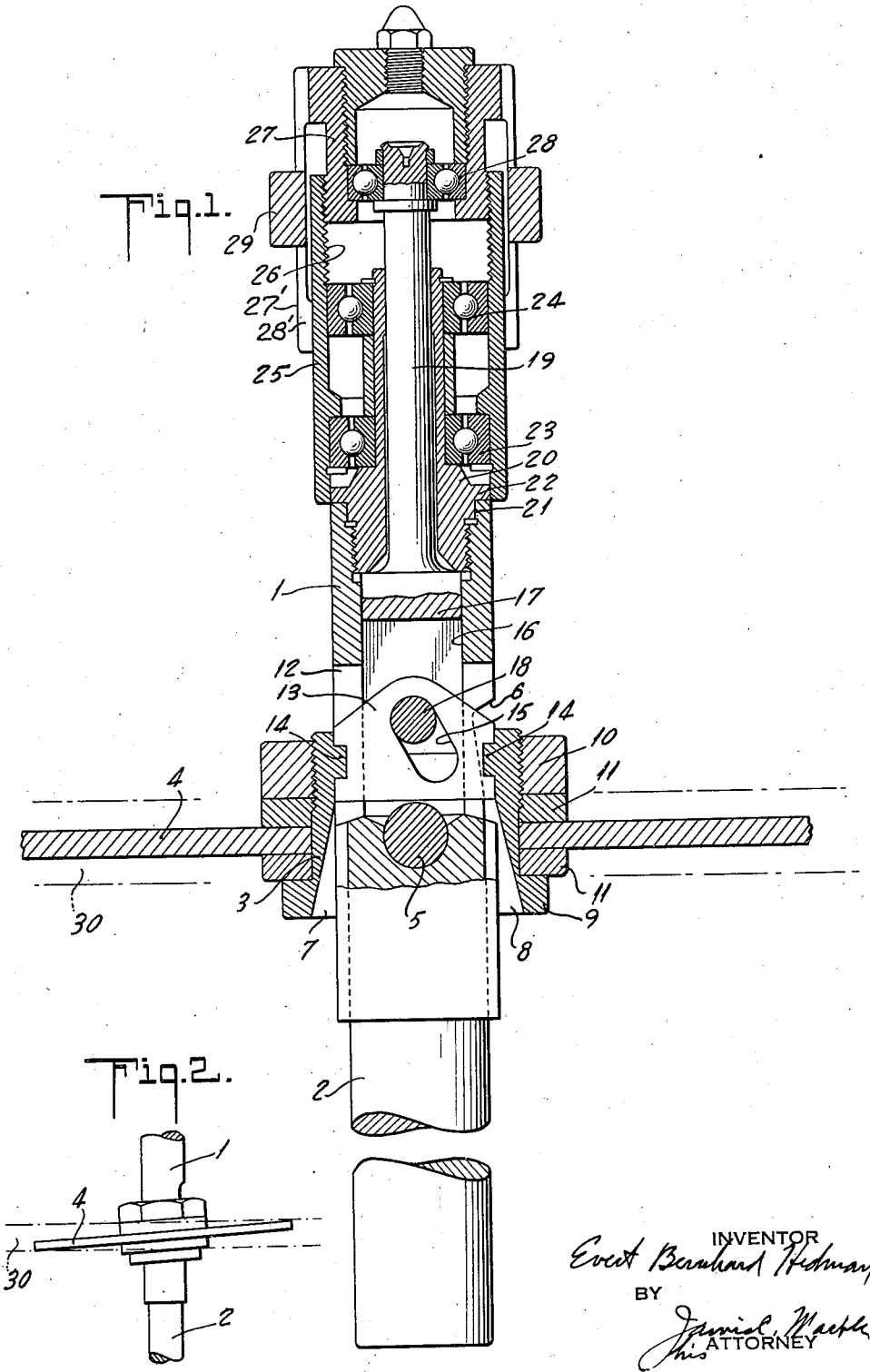
INVENTOR
Evert Bernhard Hedman
BY
ATTORNEY Patented Feb. 15, 1949

2,462,022

UNITED STATES PATENT OFFICE 2,462,022

CUTTER SHAFT WITH INCLINABLE CUTTER BLADE

Evert Bernhard Hedman, Stockholm, Sweden, assignor to Aktiebolaget Superior, Stockholm, Sweden, a corporation of Sweden Application March 16, 1945, Serial No. 583,071
In Sweden June 5, 1943

Section 1, Public Law 690, August 8, 1946
Patent expires September 25, 1963

5 Claims. (Cl. 144—238)

My invention relates to a cutter shaft with an inclinable cutter-blade.

The present invention refers to a cutter shaft, especially for wood-dressing machines, having its cutter disk mounted in an inclinable mount upon the shaft thus enabling the adjustment of the blade to different angular positions on the shaft and the production of grooves of different widths in a work piece. Such cutter shafts are rotated at a relatively high speed and are often adjustable to different positions of height.

An object of the invention is the provision of such an adjusting device for the mount that the high speed of the cutter shaft can be maintained. Another object is the provision of an adjusting device which does not prevent adjustment of the cutter shaft to different positions of height. A further object is the provision of an adjusting device of stable construction. A further object is the provision of an adjusting device freely carried upon the cutter shaft and permitting adjustment of the cutter disk even during working. A still further object is the provision of such a construction and arrangement of the elements comprised in the adjusting device that the balance of the cutter shaft is maintained.

These and other objects of the invention will be understood from the following description and the annexed drawing, which forms part of this specification and on which:

Fig. 1 is a cross-sectional view of a preferred embodiment of my invention; and

Fig. 2 is an elevational view, on a reduced scale, showing the device of Fig. 1, but with the cutter in an inclined position.

Referring to the drawing, I designates a hollow cutter shaft having a shank 2 intended to be rotatably mounted in a machine-tool. A mount 3 for a cutter disk or blade 4 is pivoted on a pin 5, arranged in the cutter shaft I, a notch 6 in one side of the shaft and two diametrically opposing notches 7 and 8 in the mount 3 enabling restricted movement of the mount upon the pin 5. Only the notch 7 is required, the notch 8 being made for balancing purpose. The mount 3 is provided with a flange 9 and a nut 10 between which is clamped the cutter disc 4, and there being provided a pair of washers 11 in order to make the center plane transverse to the axis of the cutter disk pass through the center of the pin 5. The thickness of these washers 11 is consequently to be matched with the thickness of different cutter discs. The hollow shaft I is provided with a transverse opening 12 in which is disposed a plate 13. Shoulders 14 on the mount engage recesses in opposite edges of the plate to thereby secure the plate to the mount. A slot 15 is formed in plate 13 and inclined relative to the longitudinal direction of the cutter shaft 1. The cutter shaft 1 is also provided with an axial bore 16 in which is slidingly disposed an adjusting member 17, the end of which is forked and embraces the plate 13 with its prongs, the adjusting member 17 being conected with the plate 13 by means of a pin 18, fastened in said prongs and passing through the slot 15. The adjusting member 17 is provided with a cylindrical shank or spindle 19, extending through a tubular member 20, coaxial with the shaft 1 and screwed into an outer, threaded part of the bore 16 and centered in the shaft 1 by means of a cylindrical surface 21 and a plane surface on the bottom of a flange 22. A sleeve 25 is rotatably mounted on member 20 by ball bearings 23 and 24, at least one of which is capable of transmitting thrust. The sleeve 25 is thus rotatable relative to the cutter shaft 1 but fixed axially relative to it. Above the upper ball bearing 24 the sleeve 25 is provided with an internally threaded portion, into which a regulating means 27 is screwed. The shank 19 extends into the regulating means 27 and a thrust transmitting ball bearing 28 is arranged between these parts so that they cannot be displaced axially relative to each other. When turning the regulating means 27 so that it is screwed into or out from the sleeve 25, the shank 19 is thus axially displaced. In order to lock regulating means 27 against undesired movement relative to sleeve 25, there is provided on the regulating means 27 a plurality of circumferentially arranged axially extending resilient arms 27', the inner ends 28' of which extend over the outer surface of sleeve 25. The inner ends 28' are normally urged away from the surface of sleeve 25 by the resilience of arms 27'. In order to clamp the inner ends 28' against the surface of sleeve 25 and thus prevent rotation relative thereto, there is provided a cylindrical clamping sleeve 29 slidably received on arms 27' which when in place on the arms clamps inner ends 28' against the surface of sleeve 25. The inner ends 28' are released by merely removing the clamping sleeve 29.

In order to incline the cutter disk 4 so that a groove 30 of desired width, indicated by dot and dash lines, is obtained in a work-piece, one conveniently removes the clamping sleeve 29 and holds the sleeve 25 and turns the regulating means 27 in the necessary direction in relation to the sleeve 25. The axial displacement of the regulating means 27, obtained in this way, displaces the shank 19 and the adjusting member 17, so that the pin 18 slides in the inclined slot 15 and causes a pivoting about pin 5 of the plate 13 and hence of the mount 3 with the cutter disk 4, and thus the desired width of the groove may be obtained. Due to the described connection between the cutter shaft 1 and the sleeve 25 and between the shank 19 and the regulating means 27 the adjustment may take place, while the cutter shaft 1 is rotating, and therefore an exact and quick adjustment according to the desired width of the groove or cut may be made. The adjustment can be done with great accuracy due to the construction of the plate 13 and adjusting member 17. The described execution of the various parts renders possible good balancing of them upon the cutter shaft and there is no tendency towards a change in setting on account of the high rotational velocity. Since all parts are freely carried upon the cutter shaft and do not need any support against any fixed point of the machine tool or the like, the cutter shaft may be adjusted in any direction without hindrance. The cutter blade may be changed without removing other parts than the clamping sleeve 20, the nut 10 and the washer 11 and therefor the change may be rapidly and easily made.

It will be understood that modifications in the various elements of the device may be made without departing from the spirit of the invention.

What is claimed:

1. In a device of the class described, a driven hollow shaft, a mount pivotally carried by said shaft, a cutter disc secured to said mount, a member rotatably mounted on said shaft and fixed axially with respect thereto, an adjusting member carried solely by and axially displaceable with respect to the first-mentioned member, and means disposed within said hollow shaft and rotatably connecting said adjusting member with said mount and having means engaging said mount whereby axial displacement of the adjusting means pivots the mount relative to the shaft.

2. In a device of the class described, a hollow shaft, a mount pivotally carried by said shaft, a cutter disc secured to said mount, said shaft having a transverse slot in the neighborhood of said mount, an arm fixed to said mount and extending into said slot, said arm being formed with a surface inclined with respect to the axis of the shaft, a member rotatably mounted on said shaft and fixed axially with respect thereto, an adjusting member carried solely by and axially displaceable with respect to the first-mentioned member, a spindle rotatably connected to said adjusting member and extending within said hollow shaft, and means carried by said spindle engaging the inclined surface in said arm.

3. In a device of the class described, a hollow shaft, a mount pivotally carried by said shaft, a cutter disc secured to said mount, said shaft having a transverse slot in the neighborhood of said mount, an arm fixed to said mount and extending into said slot, said arm being formed with a slot inclined with respect to the axis of the shaft, a member rotatably mounted on said shaft and fixed axially with respect thereto, an adjusting member carried by and axially displaceable with respect to the first-mentioned member, a spindle rotatably connected to said adjusting member and extending within said hollow shaft, said spindle having a forked end embracing said arm, and a pin carried by said forked end and extending through the inclined slot in said arm.

4. In a device of the class described, a hollow shaft, a mount pivotally carried by said shaft, a cutter disc secured to said mount, said shaft having a transverse slot in the neighborhood of said mount, an arm fixed to said mount and extending into said slot, said arm being formed with a slot inclined with respect to the axis of the shaft, a member rotatably mounted on said shaft and fixed axially with respect thereto, an adjusting member having screw threaded engagement with said first-mentioned member, a spindle rotatably connected to said adjusting member and extending within said hollow shaft, and a pin carried by said spindle and extending into the inclined slot in said arm.

5. In a device of the class described, a hollow shaft, a mount pivotally carried by said shaft, a cutter disc secured to said mount, said shaft having a transverse slot in the neighborhood of said mount, an arm fixed to said mount and extending into said slot, said arm being formed with a slot inclined with respect to the axis of the shaft, a sleeve, thrust transmitting ball bearing means for rotatably mounting said sleeve on said shaft, an adjusting member having screw threaded engagement with said sleeve, a spindle axially displaceable within said hollow shaft, thrust transmitting ball bearing means between said spindle and said adjusting member, and a pin carried by said spindle and extending into the inclined slot in said arm.

EVERT BERNHARD HEDMAN.

REFERENCES CITED

The following references are of record in the file of this patent:

UNITED STATES PATENTS

| Number | Name | Date |
|---|---|---|
| 1,530,593 | Calkins | Mar. 24, 1925 |
| 1,709,649 | Adamson | Apr. 16, 1929 |
| 2,314,084 | Fried | Mar. 16, 1943 |
| 2,365,549 | Haynes | Dec. 19, 1944 |

FOREIGN PATENTS

| Number | Country | Date |
|---|---|---|
| 33,180 | Denmark | Apr. 29, 1924 |